United States Patent [19]
Bently

[11] Patent Number: 6,092,029
[45] Date of Patent: Jul. 18, 2000

[54] METHOD AND APPARATUS FOR DIAGNOSING AND CONTROLLING ROTATING STALL AND SURGE IN ROTATING MACHINERY

[75] Inventor: Donald E. Bently, Minden, Nev.

[73] Assignee: Bently Nevada Corporation, Minden, Nev.

[21] Appl. No.: 09/025,801

[22] Filed: Feb. 19, 1998

[51] Int. Cl.[7] .................................................. G05B 13/00
[52] U.S. Cl. ............................................. 702/56; 702/190
[58] Field of Search .................. 702/56, 190, FOR 113; 364/148–164, 528.22, 528.24, 528.27

[56] References Cited

U.S. PATENT DOCUMENTS

| | | |
|---|---|---|
| Re. 34,388 | 9/1993 | Dubin et al. . |
| 3,680,363 | 8/1972 | Holz et al. ................................. 73/660 |
| 4,196,472 | 4/1980 | Ludwig et al. . |
| 4,257,747 | 3/1981 | Goldman .................................. 73/651 |
| 5,297,930 | 3/1994 | Moore . |
| 5,310,309 | 5/1994 | Terasaki et al. . |
| 5,437,539 | 8/1995 | Gysling et al. . |
| 5,508,943 | 4/1996 | Batson et al. . |
| 5,658,125 | 8/1997 | Burns et al. ................................ 415/1 |
| 5,719,791 | 2/1998 | Neumeier et al. ................. 364/528.09 |
| 5,832,606 | 11/1998 | Kushner .................................. 29/889.7 |

*Primary Examiner*—Marc S. Hoff
*Assistant Examiner*—Craig Miller
*Attorney, Agent, or Firm*—Dennis DeBoo

[57] ABSTRACT

A method and apparatus is provided for diagnosing and correcting rotating stall and surge in rotating machines by monitoring dynamic shaft precession and comparing this precession with a standard and altering the precession as the machine approaches a destabilizing condition when indicated by the comparison step. Axial vibration monitoring means is also provided for monitoring and comparing a dynamic axial vibration of the machine with a standard and altering the axial vibration as the machine approaches a destabilizing condition. Furthermore, the instant invention measures the complex dynamic stiffness of the machine and computes the direct dynamic stiffness and the quadrature dynamic stiffness for use as a destabilizing warning device by monitoring for a drop in direct dynamic stiffness and/or a coincidence of zero crossing of both the direct dynamic stiffness and the quadrature dynamic stiffness components. One embodiment for altering the rotating stall and/or surge is by a controlled active servobearing.

33 Claims, 9 Drawing Sheets

METHOD AND APPARATUS FOR DIAGNOSING AND CONTROLLING ROTATING STALL AND SURGE IN ROTATING MACHINERY

FIELD OF THE INVENTION

The instant invention relates generally to machinery having a rotating stage, such as a compressor or pump and, more particularly, to machinery subject to operating anomalies known as rotating stall and surge and to a method and apparatus for diagnosing and controlling the occurrence of such stall and surge anomalies from a rotor dynamic viewpoint.

BACKGROUND OF THE INVENTION

Rotating stall and surge are important machine phenomena which can lead to dangerous machine damage in rotating machines such as a compressor as a result of a plurality of reasons. First, rotor vibrations resulting from the stream line degradation can damage labyrinths between stages. In addition, flow reversals can cause continuous increase in temperature at impeller vane entrances (and a corresponding decrease in discharge head capability), resulting in surge cycling. Also, pressure variations between intake and discharge ends of the compressor can cause rapid changes in axial thrust, thereby risking damage to the thrust bearing. Furthermore, abrupt load and speed changes may occur thereby detrimentally affecting the impellers and other internal compressor and driver components.

Heretofore, rotating stall and surge was viewed as an aerodynamic problem and aerodynamically the rotating stall and surge has been investigated extensively. This research has led to the following common industry definitions of local stall, stage stall, stall zone, surge and rotating stall. Local stall is a flow separation or reversal in either an impeller or diffuser. Stage stall is when a local stall increases to the point where one in a series of centrifugal impellers (and associated inlet and discharge stationary components) experiences reverse flow in part of its cross-sectional flow area. The overall flow is still in a forward, pressurizing direction. A stall zone is any cross-sectional area of an impeller or diffuser which undergoes a flow perturbation and which manifests symptoms of a stall in a centrifugal compressor. Surge is defined as periodic flow oscillations and pressure swings. If these oscillations include flow reversals it is a deep surge. The rate of gas flow is not enough to adequately fill the spaces between consecutive guide vanes. Surge propagates axially. Rotating stall, also called propagating stall, consists of large stall zones covering several blades and passages. Rotating stall propagates circumferentially at some fraction of rotor speed. The number of stall zones and the propagating rates vary considerably.

Heretofore, the solution to the phenomena of rotating stall and surge has been to monitor and alter the pressure flow within the compressor by altering the discharge pressure rate and/or the inlet pressure rate via valves. In addition, the monitoring of pressure and temperature has been used as a signature for detecting stalls. Furthermore, mechanical structures have been added to the compressor in the form of geometrically altered blades and vanes and free wheeling rotors. Therefore, even though aerodynamically the rotating stall phenomena has been investigated extensively, the rotor dynamic implications of this phenomena has received little attention. Thus, a need exists for a better understanding of rotating stall in centrifugal compressors from vibration diagnostics and rotor dynamic standpoints. In addition, a need exists for an apparatus and method which provides a vibrational diagnostic and rotor dynamic solution to the problem and not merely interacting to the aerodynamic results of rotating stall and surge conditions.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 4,196,472 | April 1, 1980 | Ludwig, et al. |
| Re. 34,388 | September 28, 1993 | Dubin, et al. |
| 5,297,930 | March 29, 1994 | Moore |
| 5,310,309 | May 10, 1994 | Terasaki, et al. |
| 5,437,539 | August 1, 1995 | Gysling, et al. |
| 5,508,943 | April 16, 1996 | Batson, et al. |

SUMMARY OF THE INVENTION

This instant invention is distinguished over the known prior art in a multiplicity of ways. One of the starkest differentiations which the instant invention enjoys over the known prior art involves the fact that the instant invention deals with rotating stall and surge in rotating machinery from vibrational diagnostic and rotor dynamic view points. More specifically, the instant invention is an active system which monitors machine vibration for operating anomalies known as rotating stall and surge and predicts and controls the occurrence of such stall and surge anomalies. The occurrence of such rotating stall and surge anomalies are altered prior to causing machine damage as a result of this active intervention.

In one preferred form, the instant invention employs at least one pair of orthogonal eddy current displacement transducers which are operatively coupled to the rotating machine and to a processing means. The transducers sense raw dynamic lateral machine vibration of a rotating shaft of the machine and output electrical signals to the processing means. The processing means converts the electrical signals into, for example, orbital plots to determine the rotor vibration signature. This signature is then compared to a standard or paradigm and the precession of the shaft is altered as the machine approaches a stall condition indicated by the comparison step. The precession of the shaft is preferably altered by introducing a fluidic force by injecting fluid through a bearing port to coact with the rotating shaft.

In addition, at least one eddy current displacement transducer can be operatively coupled to the machine and to the processing means for measuring axial vibration of, for example, a thrust collar of the machine. This measurement can then be compared to a standard or paradigm and the axial deflection of the shaft can be altered as the machine approaches a rotating stall or surge condition when indicated by the comparison step.

Furthermore, the instant invention provides a method and apparatus for determining a machine's complex dynamic stiffness which includes a direct dynamic stiffness component and a quadrature dynamic stiffness component. These components can then be used as a stall warning device and also for diagnosing and correcting rotor dynamic destabilizing effects. Specifically, the direct dynamic stiffness component can be monitored and compared with a standard or paradigm correlative to rotating stall. For example, the quadrature dynamic stiffness component can be monitored for a drop indicating rotating stall. Moreover, the direct and quadrature dynamic stiffness components can be monitored for the coincidence of zero crossings of both components for diagnosing destabilizing effects due to stall and surge conditions.

OBJECTS OF THE INVENTION

Accordingly, a primary object of the instant invention is to provide a new, novel and useful method and apparatus for diagnosing and correcting rotating stall and surge effects in rotating machinery.

A further object of the present invention is to provide a method and apparatus as characterized above which determines a direct dynamic stiffness component of the machinery for developing a precursor to rotating stall.

Another further object of the present invention is to provide a method and apparatus as characterized above which determines the complex dynamic stiffness of the machinery for developing a precursor to rotating stall and surge.

Another further object of the present invention is to provide a method and apparatus as characterized above which uses a signal from a vibrational monitoring means for controlling rotating stall.

Another further object of the present invention is to provide a method and apparatus as characterized above which uses a signal from a vibrational monitoring means for controlling surge.

Another further object of the present invention is to provide a method and apparatus as characterized above which uses a signal from a vibrational monitoring means for providing immediate vibration suppression to protect the rotor and/or seal system from damage.

Another further object of the present invention is to provide a fast acting control system by monitoring, inter alia, machine vibration (shaft deflection) of a shaft of a compressor and employing the monitored signals to provide direct mechanical action for altering the deflection of the shaft as the machine approaches a stall or a destabilizing condition.

Another further object of the present invention is to provide a control system which monitors rotor dynamic anomalies for alternately or additionally providing a control signal which is employed to provide corrective action on rotating machine variables such as driving speed or suction/discharge pressure of a compressor.

Viewed from a first vantage point, it is an object of the present invention to provide a diagnostic and corrective method to avert stall in a bearing supported rotating machine having a fluid throughput, the steps including: monitoring deflection of a shaft about which the machine rotates; comparing the deflection with a standard, and altering the deflection of the shaft as the machine approaches a stall when indicated by the comparison step.

Viewed from a second vantage point, it is an object of the present invention to provide a method for tuning a rotating machine to preclude stall, the steps including: inducing a stall into the machine to determine stall characteristics for the machine; recording the stall characteristics leading up to at least the stall condition; monitoring the machine against the recorded stall characteristics, and correcting machine parameters prior to inception of a subsequent stall.

Viewed from a third vantage point, it is an object of the present invention to provide a stall preclusion apparatus, comprising in combination: a rotating machine including a shaft; monitoring means operatively coupled to the rotating machine; means to vary a machine parameter operatively coupled to the machine, and processing means interposed between the monitoring means and the means to vary a machine parameter to enable the means to vary a machine parameter upon indication of a prestall condition.

Viewed from a forth vantage point, it is an object of the present invention to provide an apparatus for diagnosing and controlling rotating stall in rotating machinery, an apparatus comprising in combination: means for sensing raw dynamic machine vibration signals correlative to shaft precession; means for comparing the signals with a paradigm of machine stall conditions; means for altering shaft precession as the machine approaches a stall condition when indicated by the comparison step.

Viewed from a fifth vantage point, it is an object of the present invention to provide a diagnostic and corrective method to avert stall in a bearing supported rotating machine having a fluid throughput, the steps including: monitoring deflection of a shaft about which the machine rotates; computing a direct dynamic stiffness component of the machine; altering the deflection of the shaft as a function of a drop in the direct dynamic stiffness component.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to the apparatus and method according to the instant invention.

In its essence and referring to the drawing figures, the instant invention provides a method and apparatus for diagnosing and correcting destabilizing effects in rotating machines by measuring the dynamic stiffness of the machine and computing the direct dynamic stiffness and/or the quadrature dynamic stiffness for use as an instability warning device and also for diagnosing and correcting rotor dynamic destabilizing effects. Corrective action is taken correlative to the diagnosed anomalies and these actions can take the form of, inter alia, increasing the stiffness of the bearing, increasing the flow through the machine M, decreasing the discharge pressure and/or applying a force causing a response opposing measured machine vibration.

The instant invention preferably includes an active control system 20 which monitors machine vibration for operating anomalies known as rotating stall and surge and predicts, controls and suppresses the occurrence of such stall and surge anomalies. The active control system preferably includes a plurality of fluid servobearings 40 which direct fluid through portals of each fluid bearing such that fluid forces "F" may be applied to the rotor shaft S of the machine M. The servobearings 40 can be employed in pairs on both an inboard and an outboard side of the machine M. Furthermore, a combinational thrust-radial servobearing 50 can be disposed adjacent a thrust bearing of the machine M for directing fluid in both a radial and axial direction for suppressing rotating stall and surge respectively. An exemplary teaching of preferred fluid servobearings 40, 50 can be found in U.S. patent application Ser. No. 08/759415 filed Dec. 4, 1996 now U.S. Pat. No. 5,769,545 and entitled A Hydrostatic Bearing For Supporting Rotating Equipment, a Fluid Handling System Associated Therewith, A Control System Therefore, Method and Apparatus, the contents of which are incorporated in its entirety by reference herewith.

The control system 20 provides the control signals which manipulate the servobearings in order to control the flow of the fluid through portals which lead to a clearance between the rotor shaft S and the stationary fluid bearing and through at least one portal leading to the thrust collar of the machine to interact thereon. The fluid suppresses the radial and axial vibration of the machine while actively controlling and suppressing rotating stall and surge.

In addition, the instant invention provides a method and apparatus for diagnosing and correcting destabilizing effects of aerodynamic forces in rotating machines by monitoring dynamic lateral shaft precession and comparing this precession with a standard or paradigm and altering the precession as the machine approaches a stall condition when indicated by the comparison step. Preferably, the control system 20 includes an axial monitoring means 26 for monitoring axial vibration and then comparing the dynamic axial vibration with a standard or paradigm and altering the axial vibration as the machine approaches a stall or surge condition when indicated by the comparison step. The instant invention can also be used to model machines for designing a machine with a large stall margin.

Figure 1:
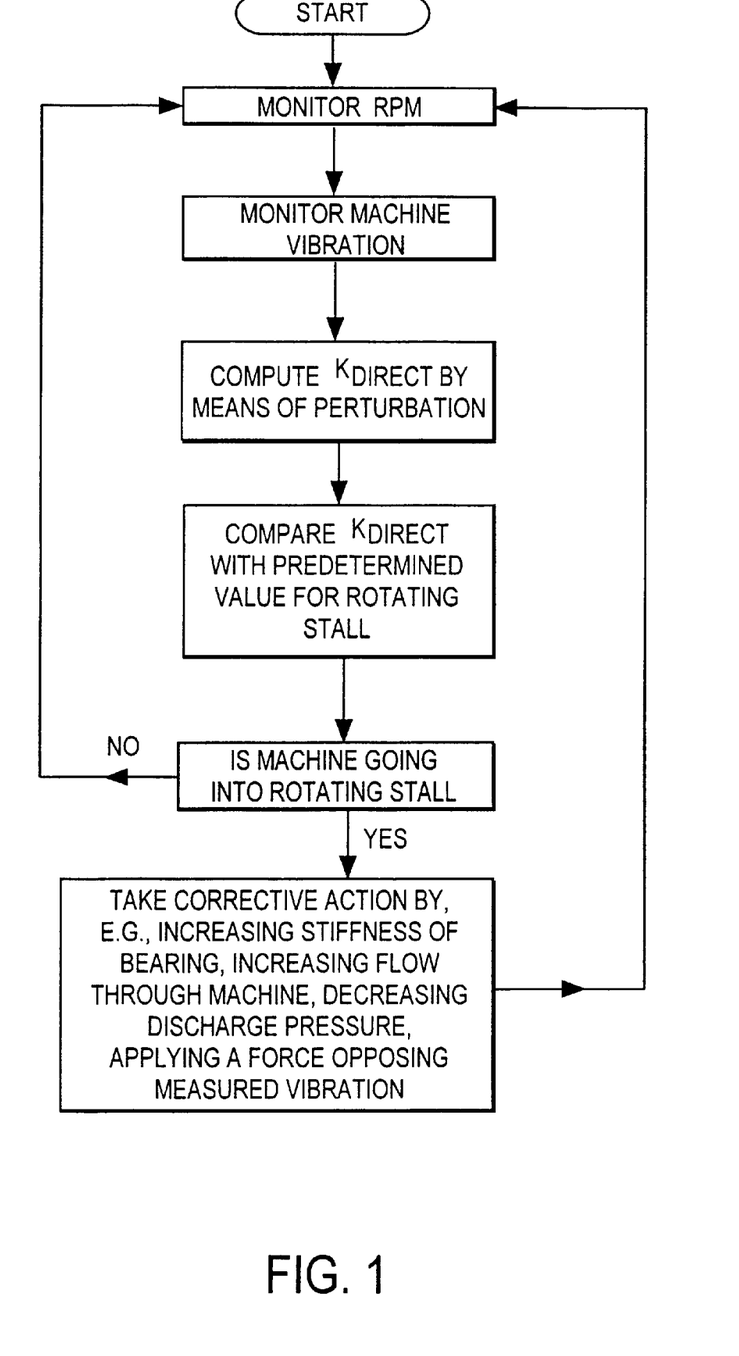
FIG. 1 is a general block diagram of a method for averting stall according to the instant invention.
Figure 2:
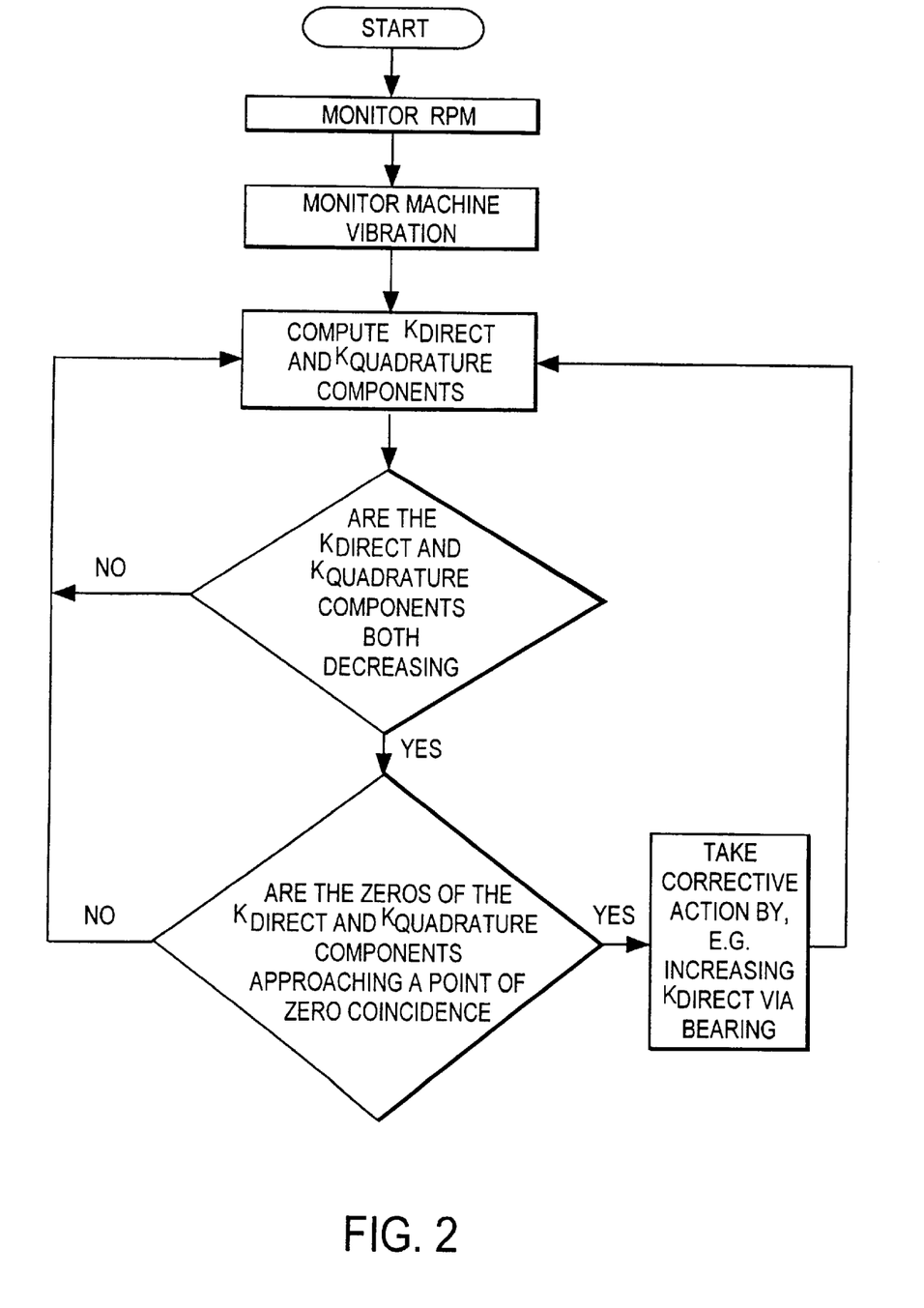
FIG. 2 is a general block diagram of a method for averting destabilizing effects according to the instant invention.
Figure 7:
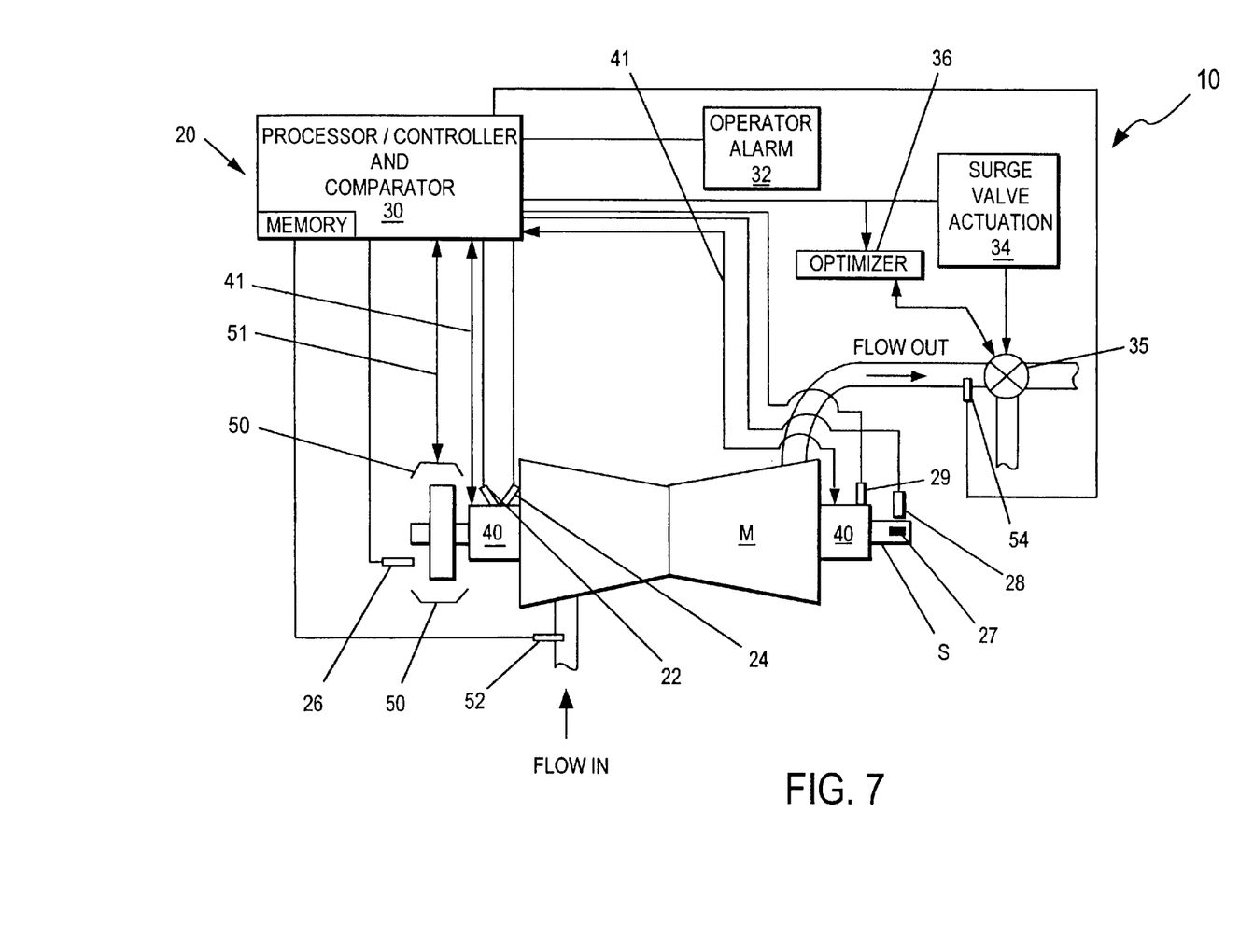
FIG. 7 is a diagrammatic view of an apparatus according to the present invention.

Referring to FIGS. 1, 2 and 7, a pair of orthogonal eddy current displacement transducers 22, 24 or as many as needed for mode identification are operatively coupled to the machine M to measure lateral shaft precession. The output of the transducers is a continuous electrical representation of the vibration or the rate of change of the vibration of the shaft of the machine M. The transducers are also coupled to a processor/controller 30 for collecting, storing and reducing vibration data correlative to the lateral shaft precession.

In addition to the orthogonal transducers a mechanical phase sensor 28 is preferably operatively coupled to the machine M for sensing a mechanical phase reference mark on, for example, the rotating shaft of the machine M. This phase sensor is preferably used to determine the speed of the machine (RPM) and to relate the mechanical angle of the rotating shaft to the electrical signals of the orthogonal transducers 22, 24 or to all necessary transducers.

Therefore, the speed of the machine can be monitored by the mechanical phase sensor 28 and machine vibration including the frequency of vibration can be monitored with the pair of orthogonal eddy current displacement transducers 22, 24. In addition, a force transducer 29 can be operatively coupled to the processor/controller 30 and disposed on a housing of at least one bearing 40 of the machine for measuring a perturbation force. The perturbation force's amplitude and phase can then be determined to provide enough information to calculate the machine's complex dynamic stiffness which includes the direct dynamic stiffness (DDS) and quadrature dynamic stiffness (QDS). Alternatively, the perturbation force's amplitude and phase can be predetermined via empirical data. The complex dynamic stiffness for a certain operating speed is determined by dividing the perturbation force vector ($F_{Perturbation}$) by the response vector ($R_{Response}$). For Example, $$\frac{F_{Perturbation}}{R_{Response}} = K_{Direct} + jK_{Quadrature}$$

and $$K_Q = j(\omega - \lambda \Omega)D$$

wherein
  $\omega$=rotor precession rate
  $\lambda$=fluid circumferential average velocity ratio due to fluid dragged into rotation by the shaft
  $\Omega$=rotor speed
  D=damping coefficient
and $$K_D = K_T - \omega^2 m$$

wherein
  $K_T$=total spring stiffness of system (mechanical stiffness plus the aerodynamic stiffness in operational conditions.)
  $\omega$=rotor precession rate
  m=mass of system More specifically, the direct dynamic stiffness (DDS) is the component of dynamic stiffness that acts collinearly to the input force vector and the quadrature dynamic stiffness (QDS) is the component of the dynamic stiffness that acts perpendicular to the input force vector. Thus, the direct dynamic stiffness and the quadrature dynamic stiffness components can be computed by the processing means 30. These computed components can be used as a rotor dynamic instability warning device by monitoring for the simultaneous zero conversion of both the direct dynamic stiffness and the quadrature dynamic stiffness (please see FIG. 2). Thus, the zeros of the direct dynamic stiffness and the quadrature dynamic stiffness components can be monitored for a critical point of zero coincidence, i.e., the zeros being on top of one another and if the critical point is reached then corrective action can be taken. In addition, and referring to FIG. 1, a drop in the direct dynamic stiffness component in comparison to, for example, a standard can be specifically used as a stall warning means.

Preferably, at least one eddy current displacement transducer 26 is also operatively coupled to the machine M to measure axial shaft vibration. The axial vibration monitoring means is operatively coupled to the processing means or the data acquisition and reduction system 30 for collecting, storing and reducing axial shaft vibration data correlative to axial shaft vibration.

Figure 8:
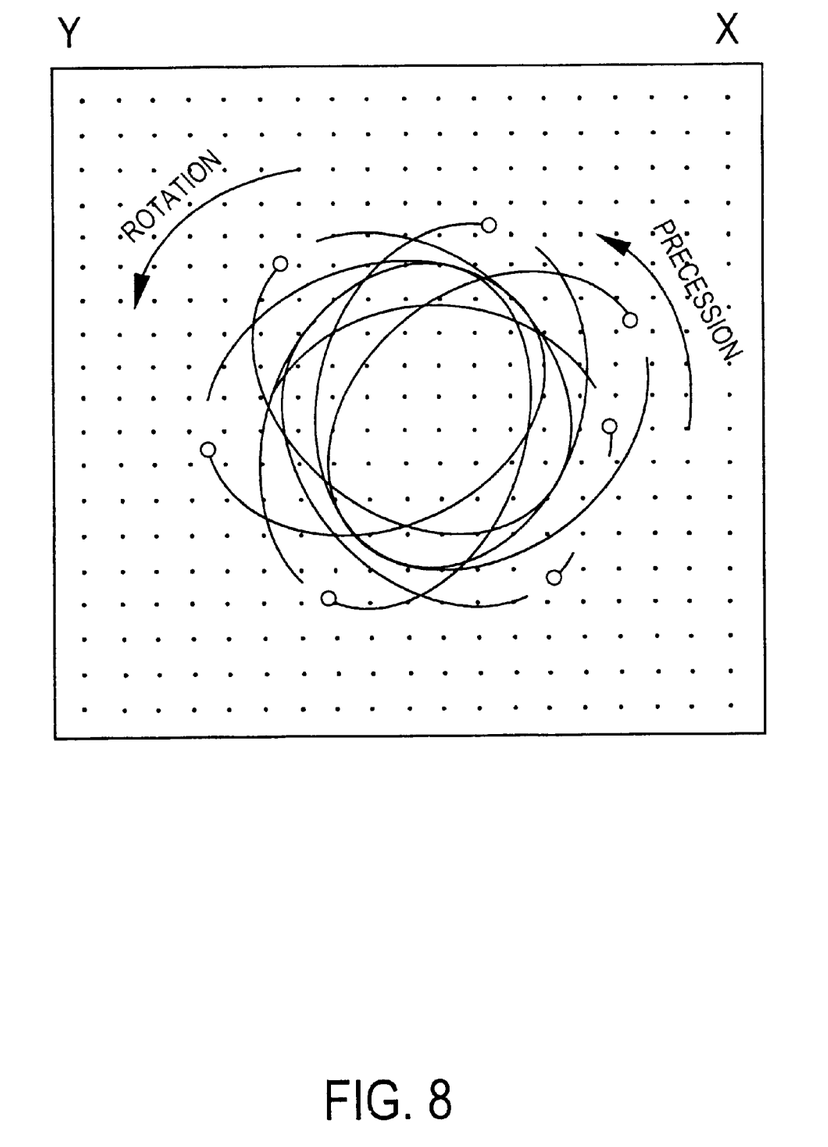
FIG. 8 is an orbital representation of vibration signals sensed by a pair of orthogonal eddy current displacement transducers and mechanical phase reference marks sensed by a mechanical phase sensor.

Referring to FIGS. 7 and 8, the output from the pair of orthogonal eddy current displacement transducers 22, 24 can be processed to obtain orbit data plots. The orbit plot represents the path of the shaft centerline as it is a representation of the orthogonal transducer's AC voltage (vibration signals). Orbit plots provide information on the amplitude of vibration, the direction of radial preloads, the direction of shaft precession and absolute and relative phase angles. Precession is the motion of vibration, relative to the direction of precession which is determined from a timebase plot by noting which transducer, X or Y, that the highest peak of vibration passes first. If, in its normal direction of rotation, an arbitrary point on the shaft would pass that same transducer first, the precession is forward. If not, precession is reverse. Thus, monitored machine speed and machine vibration including the frequency of precession can be compared to a predetermined standard for the machine. The shaft precession can then be altered as the machine approaches a stall when indicated by the comparison step (please see FIG. 3).

In use and operation, and referring to the drawings, the instant invention provides a rotating stall suppression and control system 20 which can employ an active bearing or servobearing 40 to suppress the vibration caused by rotating stall in compressors and can extract information about the state of the rotor system vibration from the control system signal used to control the active bearing. This can include 1X response to imbalance and any other nonsynchronous vibrations that may be taking place including vibrations resulting from rotating stall.

The active control bearing would perform the immediate suppression of the rotor vibration caused by the rotating stall. Simultaneously, the control signal could be analyzed by the processor/controller module 30. This module would watch for subsynchronous control signals using, for example, a low pass or band pass tracking filter. The output of this module could be used to perform a plurality of tasks. For example, a signal could be sent to a surge control valve actuator 34, which would open the surge control valve 35, thereby increasing the compressor flow in moving the compressor operating point away from the stall condition. At the same time, a signal could be sent an operator alarm 32 to sound an alert for the machine operator that subsynchronous vibration was taking place in the compressor. This type of system would have an advantage over existing rotating stall control systems in that the lateral vibration due to stall would be immediately suppressed upon detection thereby precluding damage to the rotor. Actuation of the surge control valve 34 would then eliminate the rotating stall.

In addition, it is possible to actively control the position of the surge valve using a surge valve position optimizer 36 to keep compressor operation at a point just short of rotating stall. This could be accomplished with a relatively low speed controller compared to the speed of the active bearing.

Dynamic pressure transducers can be employed to give additional information about the cause of the vibration. Thus, the pressure transducers could be used to confirm that rotating stall was taking place and then the control system could act or inform as necessary. Thus, the signal from the vibration control system can be used to control rotating stall and provide immediate vibration suppression to protect the rotor and/or seal systems from damage.

Figure 9:
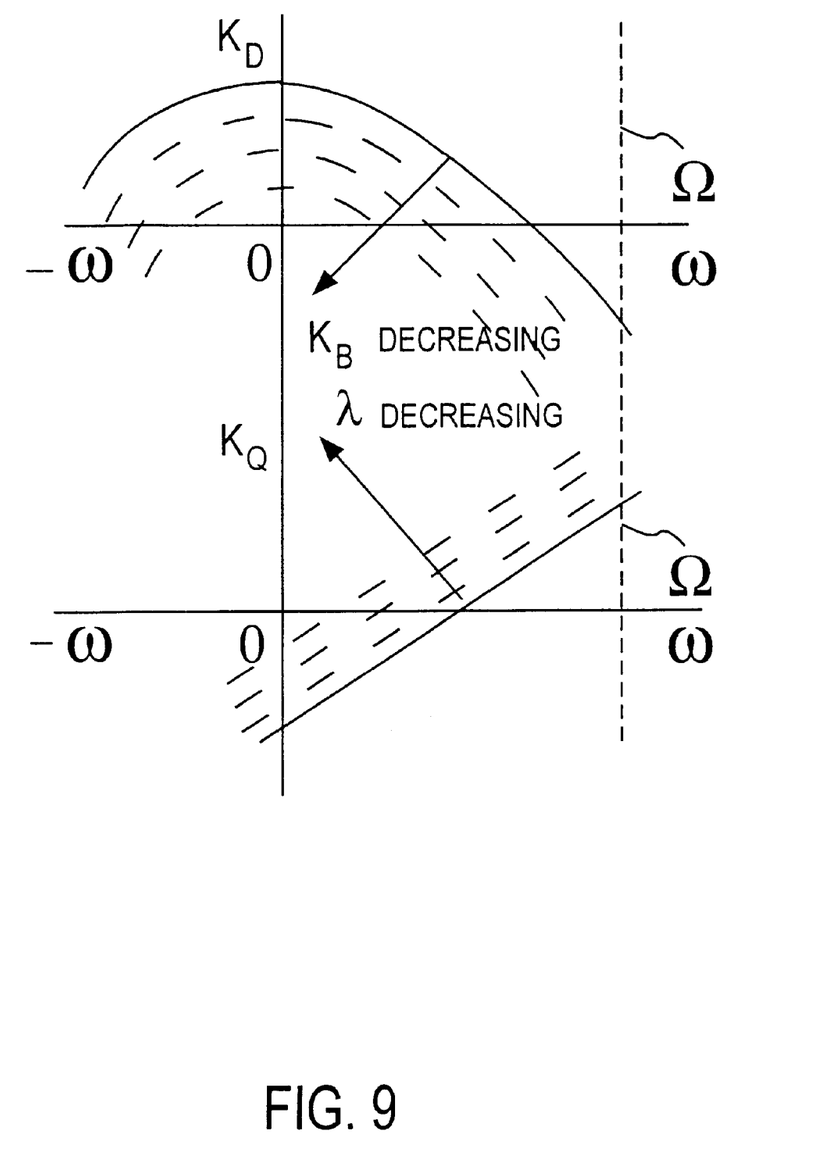
FIG. 9 is a graphical representation of dynamic stiffness plots of direct dynamic and quadrature dynamic stiffness components.

Referring to FIGS. 1, 7, and 9, the processor/controller 30 can monitor the RPM and machine vibration via phase sensor 28 sensing reference mark 27 and transducers 22, 24 respectively. This information along with a perturbation force determined empirically or via force transducer 29 can be used to determine the direct dynamic stiffness component $K_D$. The direct dynamic stiffness component can then be monitored for a drop correlative to stall and/or compared to a standard. Corrective action can then be taken by, inter alia, increasing the stiffness of the bearings, increasing the flow through the machine M, decreasing the discharge pressure and/or applying a fluidic force on the rotating shaft via the servobearings 40 and/or the combinational bearing 50 which opposes machine vibration.

Referring to FIGS. 2, 7 and 9 both the $K_{direct}$ ($K_D$) and the $K_{quadrature}$ ($K_Q$) components can be computed as delineated hereinabove by the processor/controller 30. These components can be monitored and corrective action taken when the components reach a critical point of zero coincidence by, inter alia, increasing the $K_{direct}$ component via the bearing.

Figure 3:
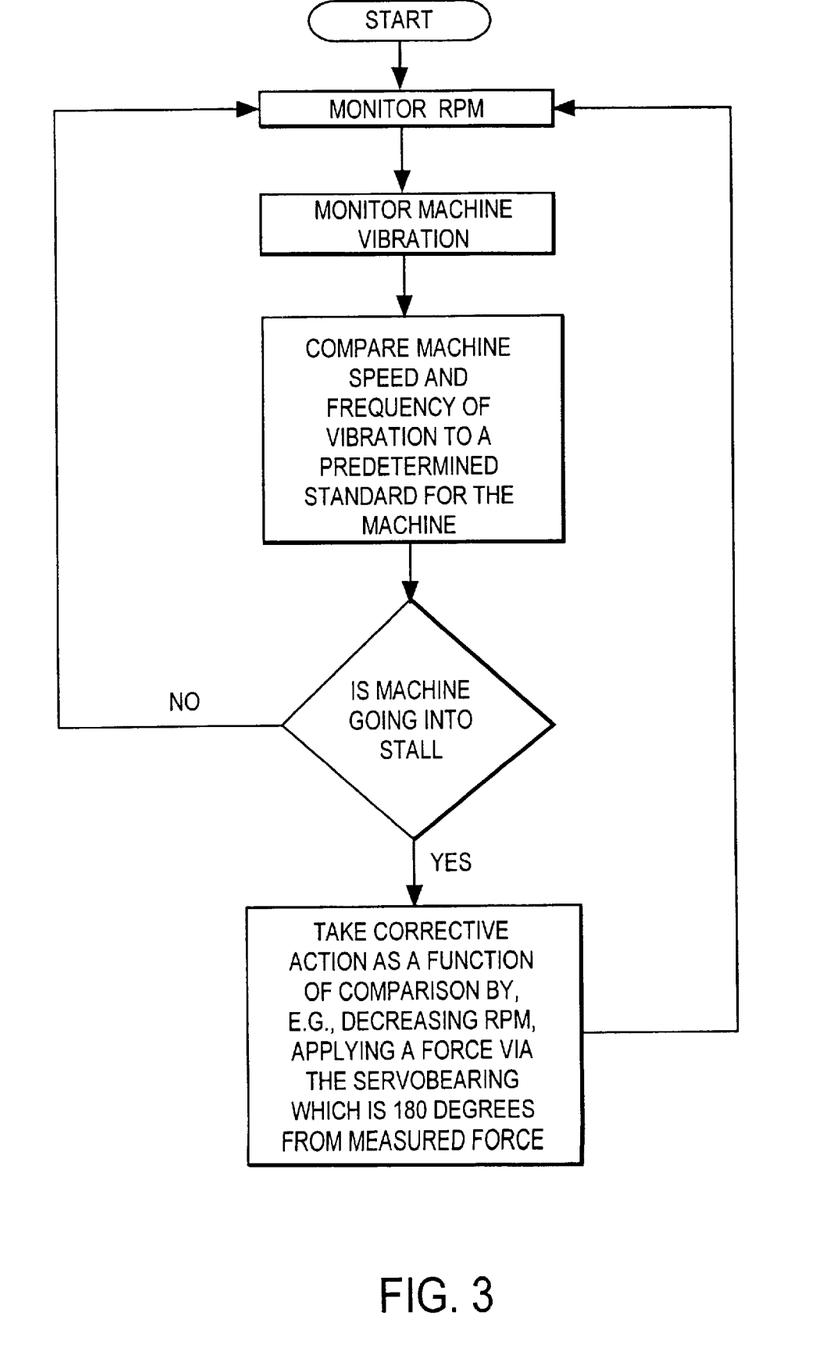
FIG. 3 is a general block diagram of a method for averting stall according to the instant invention.

Referring to FIG. 3, the processor/controller 30 can be used to monitor RPM and machine vibration including frequency via phase sensor 28 and transducers 22, 24 respectively. The machine speed (RPM) and frequency of vibration can then be compared to a predetermined standard for determining if the machine is going into stall and then taking corrective action as a function of the comparison. The corrective action can take the form of, for example, decreasing the RPM, applying a force via the servobearing 40, 50 which is 180 degrees out of phase from the measured force.

Figure 4:
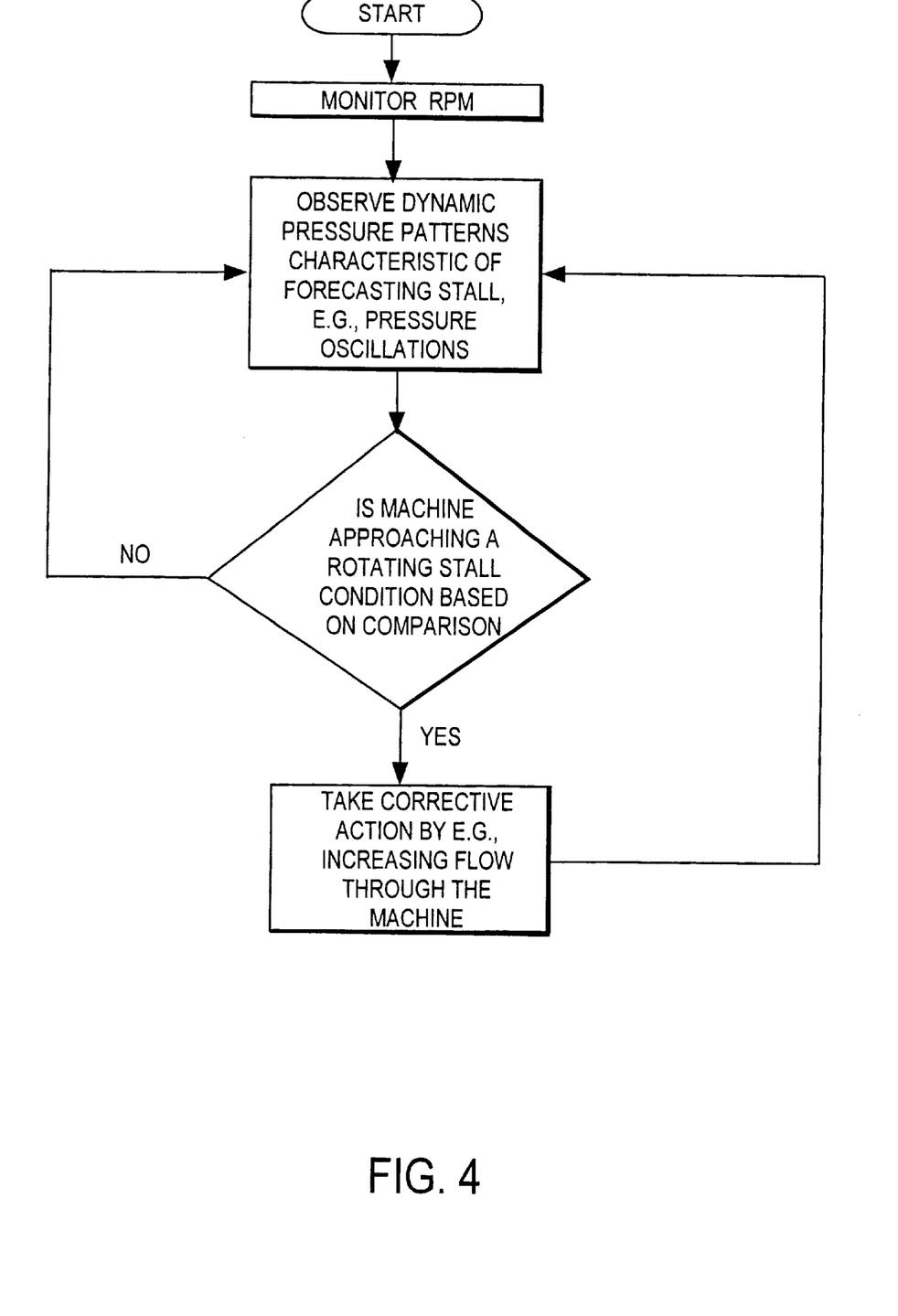
FIG. 4 is a general block diagram of a method for averting stall by observing pressure patterns according to the instant invention.

Referring to FIG. 4, the processor/controller 30 can be employed to observe pressure patterns from the processing of machine speed and vibration including frequency. These pressure patterns can then be compared with a standard and based on the comparison step corrective action can be taken by, e.g., increasing flow through the machine.

Figure 5:
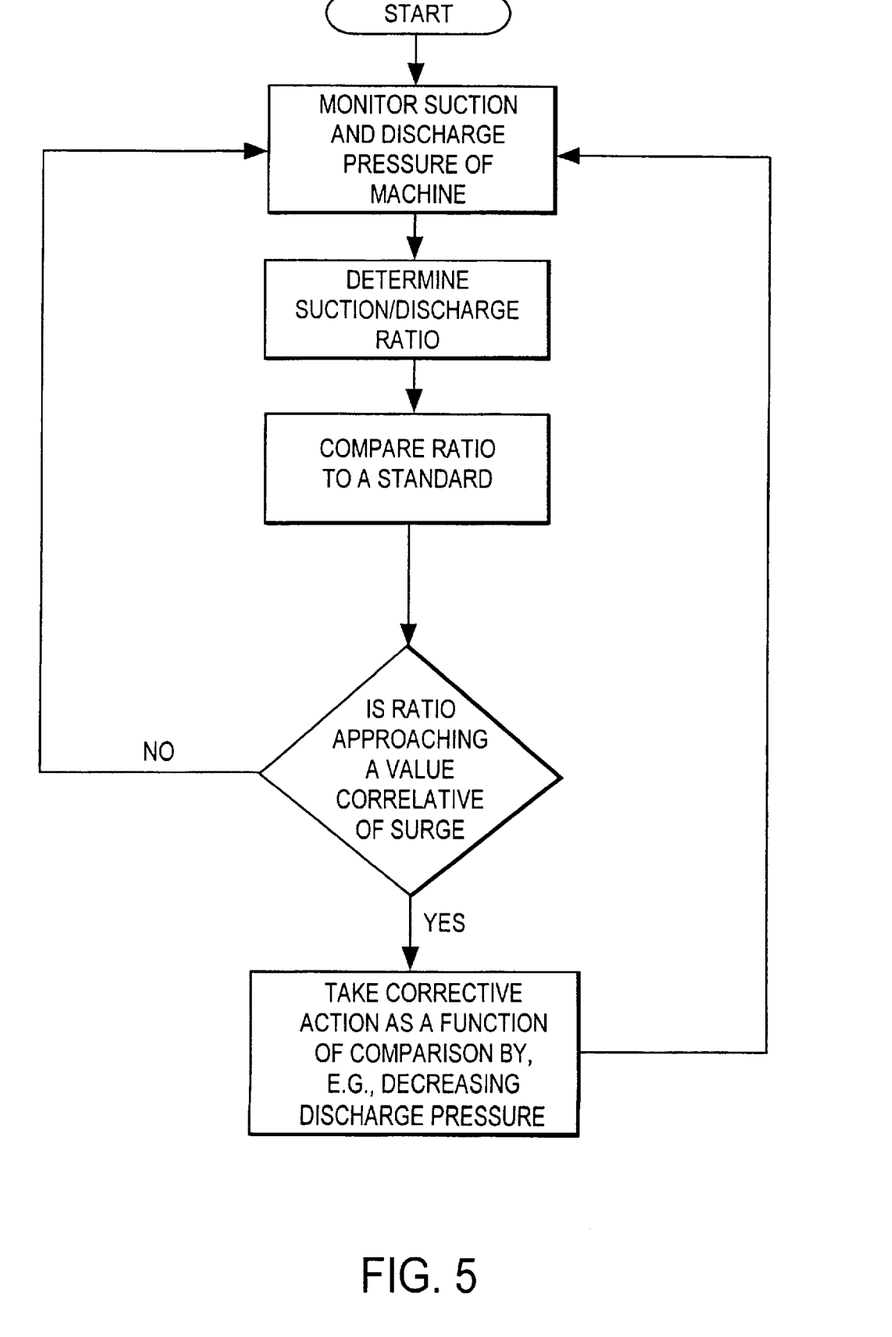
FIG. 5 is a general block diagram of a method for averting surge according to the instant invention.

Alternatively, and referring to FIG. 5, the processor/controller 30 can monitor the suction and discharge pressure of the machine via pressure transducers 52 and 54. The ratio of suction to discharge (suction/discharge) can be compared to a standard and if the ratio is approaching a value correlative to an instability condition, for example surge, corrective action can be taken by, e.g., decreasing discharge pressure.

Figure 6:
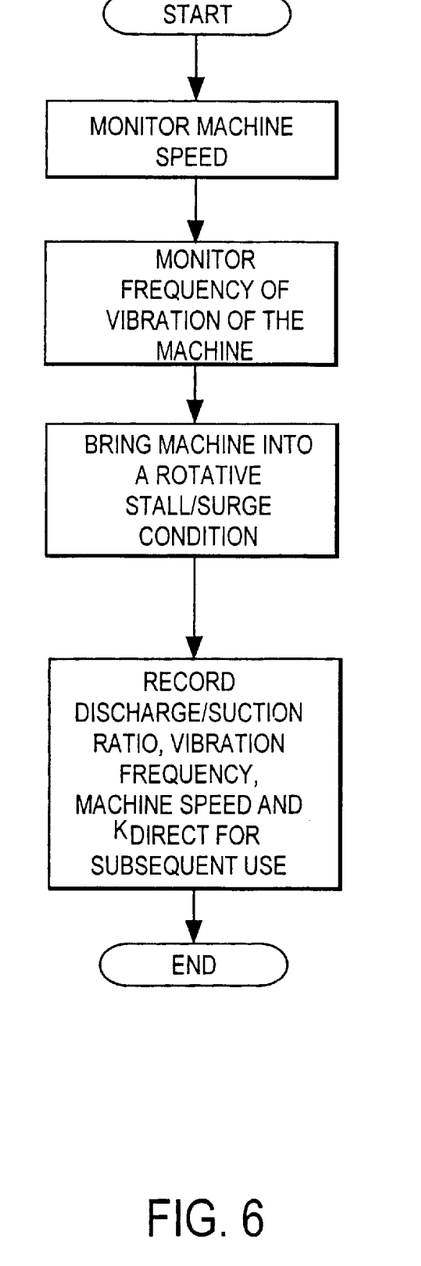
FIG. 6 is a general block diagram of a method for developing a machine stability margin for subsequent use.

Referring to FIG. 6, a paradigm or standard may be determined by monitoring machine speed, vibration including frequency, suction pressure, discharge pressure and perturbation force being applied to the machine up to and into bringing the machine into a rotative stall and/or surge condition. This data can then be stored in a memory of processor/controller 30 and used as a standard for subsequent use.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A diagnostic and corrective method to avert stall in a bearing supported rotating machine having a fluid throughput, the steps including:
    monitoring deflection of a shaft about which the machine rotates;
    comparing the deflection with a standard, and
    altering the deflection of the shaft as the machine approaches a stall when indicated by the comparison step.

2. The method of claim 1 further including the step of monitoring rotative speed of the shaft.

3. The method of claim 2 wherein the step of monitoring shaft deflection includes monitoring machine vibration including frequency thereof.

4. A diagnostic and corrective method to avert stall in a bearing supported rotating machine having a fluid throughput, the steps including:
monitoring deflection of a shaft about which the machine rotates wherein the step of monitoring shaft deflection includes monitoring machine vibration including frequency thereof;
monitoring rotative speed of the shaft;
comparing the deflection with a standard wherein the comparison step further includes the step of computing a direct dynamic stiffness component of the machine, and
altering the deflection of the shaft as the machine approaches a stall when indicated by the comparison step.

5. The method of claim 4 wherein the altering step further includes the step of altering the deflection of the shaft as a function of a drop in said direct dynamic stiffness component.

6. The method of claim 4 wherein the comparison step further includes the step of computing a quadrature dynamic stiffness component of the machine.

7. The method of claim 6 wherein the altering step further includes the step of altering the deflection of the shaft as a function of a coincidence of zero crossing of both the dynamic and quadrature stiffness components.

8. The method of claim 4 wherein the altering step further includes the step of directing a fluidic force on the rotating shaft of the machine from at least one valve under the direction of a control signal.

9. The method of claim 4 wherein the step of monitoring shaft deflection includes monitoring lateral precession of the shaft.

10. The method of claim 9 further including the step of converting lateral shaft precession to electrical signals.

11. The method of claim 10 further including the step of processing said electrical signals for identifying a vibrational signature frequency correlative of a destabilizing condition in a rotating machine.

12. The method of claim 11 wherein the altering step further includes the step of directing a fluidic force on the rotating shaft of the machine from at least one valve under the direction of a control signal.

13. The method of claim 12 wherein the rotating machine is a compressor.

14. A method for tuning a rotating machine to preclude stall, the steps including:
inducing a stall into the machine to determine stall characteristics for the machine having a rotating shaft;
recording the stall characteristics including rotating shaft precession leading up to at least the stall condition;
monitoring the machine against the recorded stall characteristics, and
correcting machine parameters prior to inception of a subsequent stall.

15. A method for tuning a rotating machine to preclude stall, the steps including:
inducing a stall into the machine to determine stall characteristics for the machine;
calculating the nonsynchronous dynamic stiffness by filtering a forward rotor response component to a frequency of an input perturbation force for a plurality of different speeds;
recording the stall characteristics leading up to at least the stall condition;
monitoring the machine against the recorded stall characteristics, and
correcting machine parameters prior to inception of a subsequent stall.

16. The method of claim 15 further including the step of determining the nonsynchronous dynamic stiffness by taking a ratio of a perturbation force to the filtered forward rotor response component for a plurality of rotative speeds.

17. The method of claim 16 further including the step of determining a direct dynamic stiffness component from the nonsynchronous dynamic stiffness.

18. The method of claim 17 further including the step of using the direct dynamic stiffness component as a stall warning parameter.

19. The method of claim 16 further including the step of determining a quadrature dynamic stiffness component from the nonsynchronous dynamic stiffness.

20. The method of claim 19 further including the step of using both the direct dynamic stiffness and the quadrature dynamic stiffness components as a instability warning parameter.

21. The method of claim 16 further including the step of determining the difference between the nonsynchronous dynamic stiffness of the compressor in a running state and a stopped state for representing an aerodynamically induced dynamic stiffness for use as a instability warning parameter.

22. A stall preclusion apparatus, comprising in combination:
a rotating machine including a shaft;
monitoring means operatively coupled to said rotating machine and including means for monitoring shaft precession correlative to machine vibration;
means to vary a machine parameter operatively coupled to the machine, and
processing means interposed between said monitoring means and said means to vary said machine parameter to enable said means to vary said machine parameter upon indication from said monitoring means of a prestall condition.

23. The device of claim 22 wherein said monitoring means includes means for monitoring lateral shaft precession.

24. The device of claim 23 wherein said lateral shaft precession monitoring means includes a pair of orthogonal eddy current displacement transducers operatively coupled to the machine to measure said lateral shaft precession.

25. The device of claim 24 wherein said processing means includes a data acquisition and reduction system operatively coupled to said pair of orthogonal eddy current displacement transducers for collecting, storing and reducing vibration data correlative to lateral shaft precession.

26. A stall preclusion apparatus, comprising in combination:
a rotating machine including a shaft;
monitoring means operatively coupled to said rotating machine wherein said monitoring means includes means for monitoring lateral shaft precession wherein said lateral shaft precession monitoring means includes a pair of orthogonal eddy current displacement transducers operatively coupled to the machine to measure said lateral shaft precession;
means to vary a machine parameter operatively coupled to the machine, and
processing means interposed between said monitoring means and said means to vary said machine parameter to enable said means to vary said machine parameter upon indication of a prestall condition wherein said processing means includes a data acquisition and reduction system operatively coupled to said pair of orthogonal eddy current displacement transducers for collecting, storing and reducing vibration data correlative to lateral shaft precession, and wherein said monitoring means further includes means for monitoring axial shaft vibration.

27. The device of claim 26 wherein said axial vibration monitoring means includes at least one eddy current displacement transducer operatively coupled to the machine to measure said axial shaft vibration.

28. The device of claim 27 wherein said axial vibration monitoring means is operatively coupled to said data acquisition and reduction system for collecting, storing and reducing axial shaft vibration data correlative to axial shaft vibration.

29. An apparatus for diagnosing and controlling rotating stall in rotating machinery, said apparatus comprising in combination:

means for sensing raw dynamic machine vibration signals correlative to shaft precession;

means for comparing said signals with a paradigm of machine stall conditions;

means for altering shaft precession as the machine approaches a stall condition when indicated by the comparison step.

30. A diagnostic and corrective method to avert stall in a bearing supported rotating machine having a fluid throughput, the steps including:

monitoring deflection of a shaft about which the machine rotates;

computing a direct dynamic stiffness component of the machine;

altering the deflection of the shaft as a function of a drop in said direct dynamic stiffness component.

31. The method of claim 30 wherein the altering step further includes the step of directing a fluidic force on the rotating shaft of the machine from at least one valve under the direction of a control signal for altering the deflection of the shaft thereby precluding a stall condition of the machine.

32. A diagnostic and corrective method to avert stall in a bearing supported rotating machine having a fluid throughput, the steps including:

monitoring deflection of a shaft about which the machine rotates;

comparing the deflection with a standard wherein the comparison step further includes the step of computing a dynamic stiffness component of the machine, and altering the deflection of the shaft as the machine approaches a stall when indicated by the comparison step.

33. A stall preclusion apparatus, comprising in combination:

a rotating machine including a shaft;

monitoring means operatively coupled to said rotating machine wherein said monitoring means further includes means for monitoring axial shaft vibration;

means to vary a machine parameter operatively coupled to the machine, and processing means interposed between said monitoring means and said means to vary said machine parameter to enable said means to vary said machine parameter upon indication of a prestall condition.

* * * * *